(12) United States Patent
Otsuka

(10) Patent No.: US 6,741,622 B2
(45) Date of Patent: May 25, 2004

(54) APPARATUS AND METHOD FOR COMPENSATING FOR TEMPERATURE OF LASER DIODE

(75) Inventor: Tatsuhiro Otsuka, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 257 days.

(21) Appl. No.: 09/903,529

(22) Filed: Jul. 13, 2001

(65) Prior Publication Data

US 2001/0048696 A1 Dec. 6, 2001

Related U.S. Application Data

(63) Continuation of application No. 09/099,066, filed on Jun. 16, 1998, now Pat. No. 6,324,198.

(30) Foreign Application Priority Data

Dec. 12, 1997 (KR) ............................................ 97-68345

(51) Int. Cl.[7] .................................................. H01S 3/00
(52) U.S. Cl. ..................................... 372/38.07; 372/33
(58) Field of Search .............................. 372/38.07, 33, 372/31, 38.1, 38.09

(56) References Cited

U.S. PATENT DOCUMENTS

| 4,367,926 A | 1/1983 | Hohki ......................... 359/310 |
|---|---|---|
| 4,663,760 A | 5/1987 | Shimada et al. ............... 372/31 |
| 4,813,046 A | 3/1989 | Shimada ....................... 372/38 |
| 4,856,008 A | 8/1989 | Senma et al. .................. 372/31 |
| 5,105,077 A | 4/1992 | Asada .......................... 250/205 |
| 5,274,653 A | 12/1993 | Ohashi ......................... 372/31 |

FOREIGN PATENT DOCUMENTS

| EP | 0 061 034 | 9/1982 |
|---|---|---|
| JP | 63-82020 | 4/1988 |
| JP | 1-304369 | 12/1989 |
| JP | 5-13852 | 1/1993 |

OTHER PUBLICATIONS

Patent Abstracts of Japan, vol. 097, No. 009, Sep. 30, 1997 & JP 09 139535, May 27, 1997 *abstract*.

*Primary Examiner*—Quyen Leung
(74) *Attorney, Agent, or Firm*—Staas & Halsey LLP

(57) ABSTRACT

A temperature compensation apparatus for controlling an output power of a laser diode according to a temperature variation of the laser diode, and a method therefor. An error voltage between a voltage corresponding to the output power of the laser diode and a reference voltage is generated. The error voltage is output as a control voltage corrected based on the output power and is applied to the laser diode. When the level of the error voltage overflows or underflows in a first up/down counter, the control voltage based on the luminous efficiency of the laser diode is output by applying the corrected control voltage to the laser diode while interlocking the first up/down counter with a second up/down counter. Accordingly, it is possible to stabilize the luminous efficiency and reduce control error of the laser diode.

21 Claims, 3 Drawing Sheets

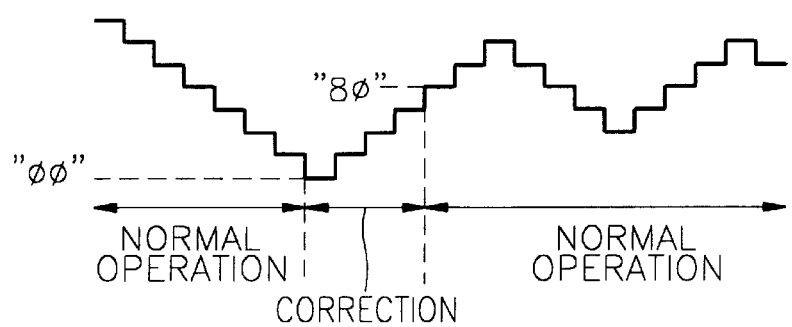
FIG. 3A
FIG. 3B
FIG. 3C
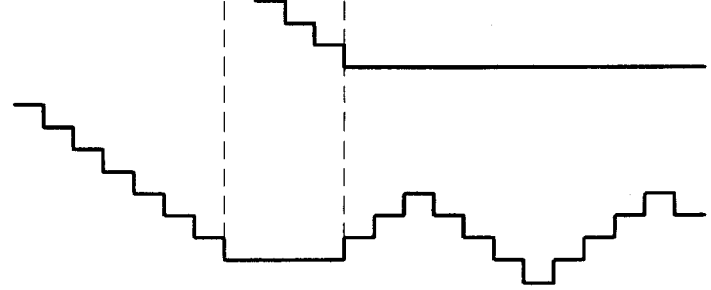
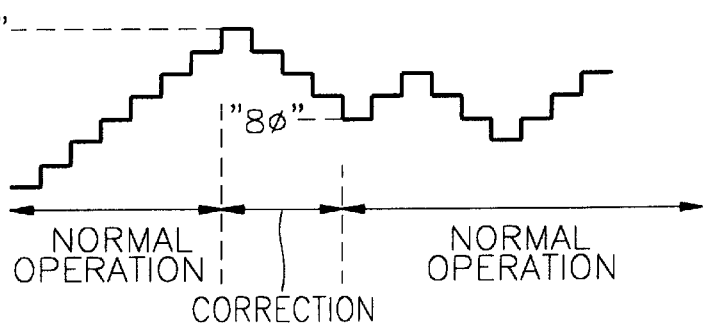
FIG. 4A
FIG. 4B
FIG. 4C
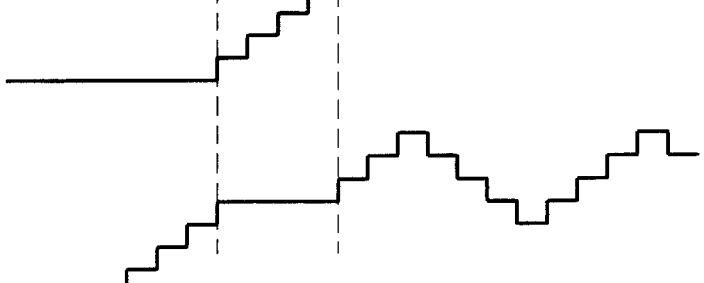

APPARATUS AND METHOD FOR COMPENSATING FOR TEMPERATURE OF LASER DIODE

CROSS-REFERENCE TO RELATED APPLICATIONS

This application is a Continuation of application Ser. No. 09/099,066, filed Jun. 16, 1998, now U.S. Pat. No. 6,324,198 B1.

This application claims the benefit of Korean Application No. 68345/97, filed Dec. 12, 1997, in the Korean Patent Office, the disclosure of which is incorporated herein by reference.

BACKGROUND OF THE INVENTION

1. Field of the Invention

The present invention relates to an apparatus and a method for compensating for the temperature of a laser diode in an optical disk field, and more particularly, to an apparatus and a method for compensating for the temperature of a laser diode in which output power changes according to the variation of the temperature.

2. Description of the Related Art

It is possible to read information from a disk without error only when light is stably emitted from a laser diode. This is achieved by controlling a luminous efficiency which changes according to the variation of the temperature of a narrow-wavelength laser diode in an optical disk field. Accordingly, it is possible to heighten the reliability of an optical recording and reproduction system.

FIG. 1 is a block diagram showing a conventional temperature compensation apparatus of a laser diode. In FIG. 1, the output of a laser diode 11 is converted into a voltage signal by a photodiode 12. An amplifier 13 amplifies a very low voltage output from the photodiode 12 to a signal level. A voltage comparator 14 compares the voltage amplified by the amplifier 13 with a reference voltage, and generates an error signal. Here, the reference voltage is generated by a reference voltage generator 15 and is previously set.

An up/down counter 16 up-counts ("increments") and down-counts ("decrements") based upon the comparison of the error signals and generates an error voltage by correcting the error signal. A digital-to-analog converter 17 converts the corrected error voltage into an analog voltage signal. A current amplifier 18 converts the analog voltage signal into a current signal for driving the laser diode 11 and applies the current signal to the laser diode 11. The output power of the laser diode 11 is controlled by continuously performing such an operation.

However, it is hard to control the variation of the optical output of the laser diode due to temperature by using only the up/down counter 16, since the variation of the temperature is severe in the narrow-wavelength laser diode. Therefore, it is impossible to compensate for the variation of the optical output by the conventional apparatus shown in FIG. 1.

SUMMARY OF THE INVENTION

To solve the above problem, it is an object of the present invention to provide a temperature compensation apparatus of a laser diode in which it is possible to reduce a control error by extending the range of the control voltage of the laser diode, considering deterioration due to the variation of the temperature of the laser diode.

It is another object of the present invention to provide a temperature compensation method of a laser diode, for stabilizing a luminous efficiency by extending the range of the control voltage of the laser diode, considering the deterioration due to the variation of the temperature of the laser diode.

Additional objects and advantages of the invention will be set forth in part in the description which follows and, in part, will be obvious from the description, or may be learned by practice of the invention.

Accordingly, to achieve the first and other objects of the present invention, there is provided a temperature compensation apparatus of a laser diode, for controlling the output power of a laser diode according to the variation of a temperature of the laser diode, including a first generator to generate an error voltage between a voltage corresponding to the output power of the laser diode and a reference voltage and a second generator to generate a corrected control voltage by receiving the error voltage, based on the output power and to output the corrected control voltage to the laser diode for a predetermined period of time when the error voltage overflows or underflows.

To achieve the second and other objects of the present invention, there is provided a temperature compensation method of a laser diode, for controlling the output power of a laser diode according to a temperature change of the laser diode, including the steps of (a) generating an error voltage between a voltage corresponding to the output power of the laser diode and a reference voltage and (b) generating a control voltage by correcting the error voltage based on the output power and extending the range of a control voltage by outputting a corrected control voltage to the laser diode for a predetermined period of time when the level of the error voltage overflows or underflows.

BRIEF DESCRIPTION OF THE DRAWINGS

The above objectives and advantages of the present invention will become more apparent by describing in detail a preferred embodiment thereof with reference to the attached drawings, in which:

FIGS. 3A to 3C describe an operation of the apparatus shown in FIG. 2 when a luminous efficiency of the laser diode rises; and FIGS. 4A to 4C describe an operation of the apparatus shown in FIG. 2 when the luminous efficiency of the laser diode falls.

DESCRIPTION OF THE PREFERRED EMBODIMENT(S)

Reference will now made in detail to the present preferred embodiments of the present invention, examples of which are illustrated in the accompanying drawings. The embodiments are described below in order to explain the present invention by referring to the figures.

Figure 1:
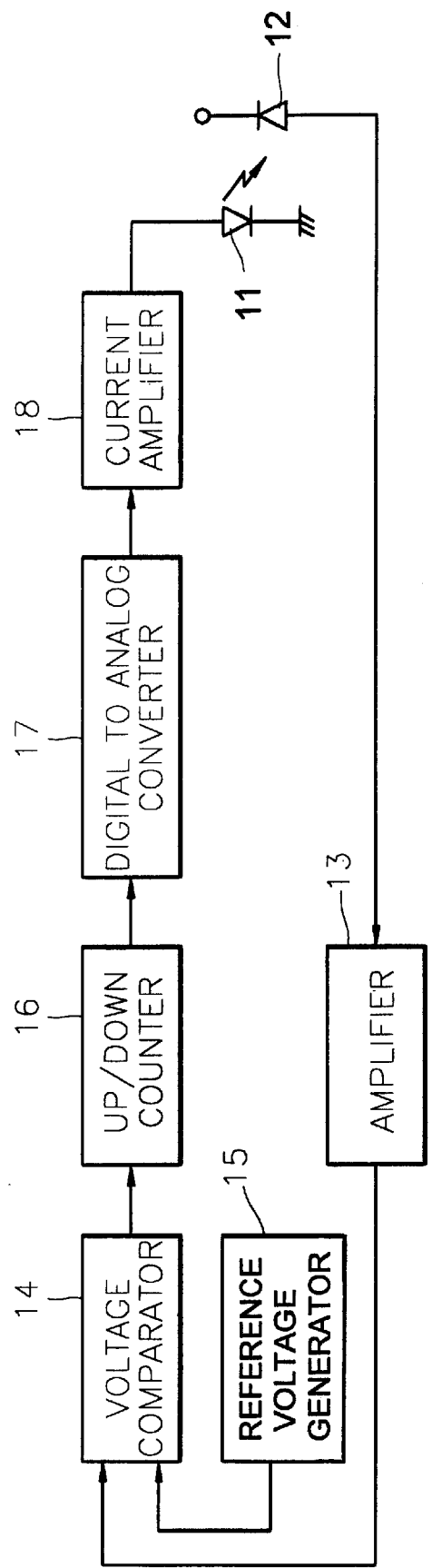
FIG. 1 is a block diagram of a conventional temperature compensation apparatus of a laser diode.
Figure 2:
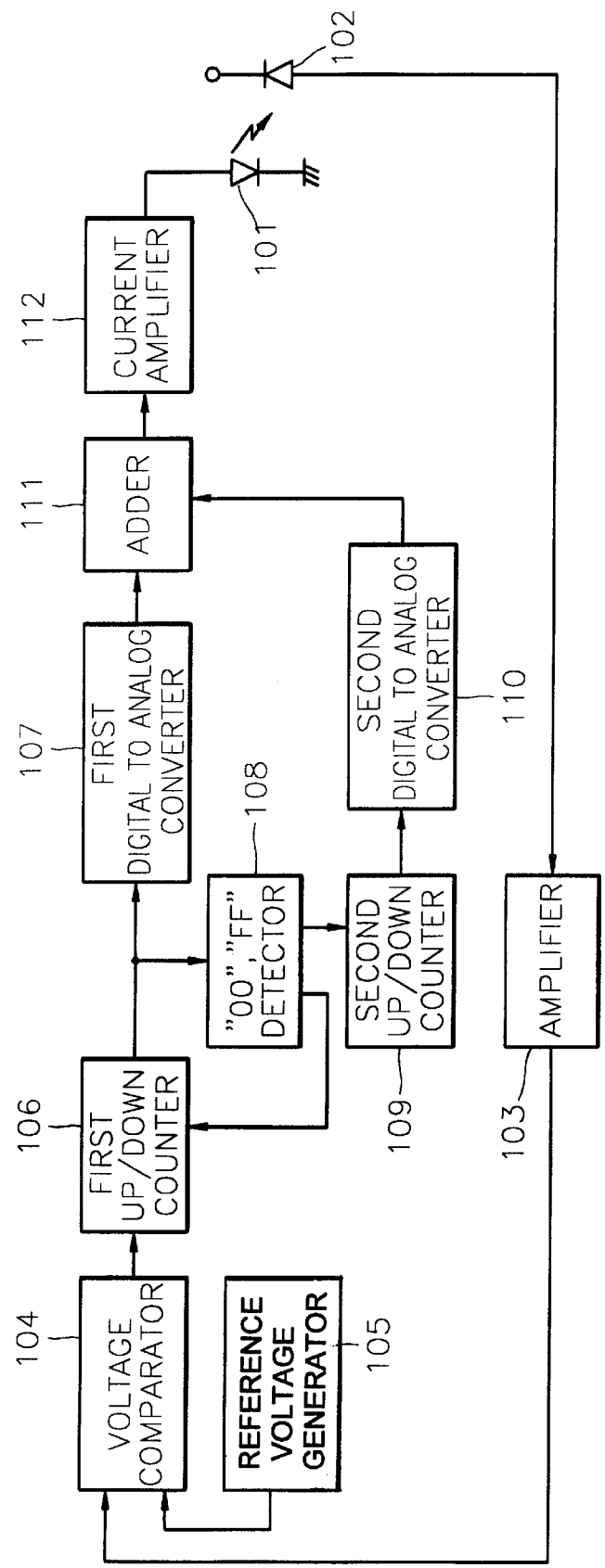
FIG. 2 is a block diagram of a temperature compensation apparatus of a laser diode, according to an embodiment of the present invention.

FIG. 2, is a block diagram of a temperature compensation apparatus according to an embodiment of the present invention, in which two up/down counters 106 and 109 and two digital-to-analog (D/A) converters 107 and 110 are used, while one up/down counter and one digital-to-analog converter are used in the conventional technology. Other new elements include an adder 111 for adding the output of the first digital-to-analog converter 107 to that of the second-to-analog converter 110, and an underflow and overflow ("00" and "FF") detector (referred to as a "detector" 108, hereinafter) for detecting when the first up/down counter 106 underflows or overflows.

The operation of the apparatus shown in FIG. 2 will now be described.

When a laser diode 101 emits light, a very low voltage corresponding to a received light signal received from the laser diode 101 by a photodiode 102 is amplified to a signal level by an amplifier 103. A voltage comparator 104 compares the output voltage of the amplifier 103 with a reference voltage 105 and applies an error signal to the first up/down counter 106. The first up/down counter 106 upcounts ("increments") and down-counts ("decrements") based upon the comparison of the error signal and applies a corrected error voltage to the first digital-to-analog converter 107 and the detector 108.

During normal operation in which the first up/down counter 106 does not underflow or overflow, the second up/down counter 109 applies a predetermined uniform value (an initial value is "80") to the adder 111 through the second digital-to-analog converter 110. The uniform value is renewed ("updated") when the underflow or overflow is generated.

The adder 111 adds the corrected error voltage, supplied from the first up/down counter 106 through the first digital-to-analog converter 107, to the voltage corresponding to the uniform value supplied from the second up/down counter 109 through the second digital-to-analog converter 110. A current amplifier 112 applies a drive current corresponding to the sum voltage from the adder 111 to the laser diode 101, to control the output power of the laser diode 101.

Meanwhile, when the first up/down counter 106 underflows ("00") or overflows ("FF") due to a temperature variation of the laser diode 101, the detector 108 generates a flag and applies it to the first and second up/down counters 106 and 109. At this time, the second up/down counter 109 is enabled according to the flag supplied from the detector 108. The first up/down counter 106 begins a count operation for performing a correction mode different from a normal mode, according to the flag supplied from the detector 108. The flag can be referred to as a detection signal.

Additionally, in the conventional technology, when the up/down counter underflows or overflows due to the temperature variation of the laser diode, the up/down counter stops operating and turns off the system.

When an underflow occurs, in which the count value (referred to as "first count value", hereinafter) of the first up/down counter 106 becomes "00," the first up/down counter 106 counts up to a predetermined offset value (here, "80"). At the same time, the second up/down counter 109 begins down counting from a predetermined value (an initial value is "80"), continuously performs down counting until the first count value becomes the offset value ("80"). Once the first count value becomes the offset value ("80"), the second up/down counter 109 maintains its count value until the underflow or overflow occurs again.

Namely, the second up/down counter 109 begins down counting from a predetermined value (an initial value is "80") when the first count value underflows, stops down counting when the first count value becomes the offset value ("80"), maintains the value at which the counting stopped, and performs down counting or up counting from the maintained value when the first count value underflows or overflows again.

When an overflow occurs, in which the first count value becomes "FF", the first up/down counter 106 performs down counting to a predetermined value (an initial value is "80"). At the same time, the second up/down counter 109 begins up counting from the offset value ("80"), and continues up counting until the first count value becomes the offset value ("80"). Once the first count value becomes the offset value ("80"), the second up/down counter 109 maintains its value, until the overflow or underflow occurs again.

The second digital-to-analog converter 110 converts the output of the second up/down counter 109 into an analog signal. The adder 111 adds the output of the first digital-to-analog converter 107 to that of the second digital-to-analog converter 110. The current amplifier 112 converts the sum voltage into a current signal to drive the laser diode 101. While the second up/down counter 109 operates due to the first up/down counter 106 overflowing or underflowing, the output of the adder 111 always has a uniform voltage. The laser diode 101 is driven by the uniform control voltage. At this time, the first up/down counter 106 performs up counting or down counting until the first count value becomes the offset value ("80").

FIGS. 3A through 3C will be explained in relation to FIGS. 4A through 4C to aid in the explanation of the operation of the temperature compensation apparatus of the present invention.

FIGS. 3A through 3C describe the operation of the first and second up/down counters 106 and 109 and a control voltage applied to the current amplifier 112 for driving the laser diode 101, when the luminous efficiency of the laser diode 101 rises.

As shown in FIG. 3A, when the first up/down counter 106 underflows ("00"), namely, the temperature of the laser diode 101 falls and the luminous efficiency rises, the second up/down counter 109 performs down counting from the offset value ("80") as "7F, 7E, 7D, . . . " as shown in FIG. 3B. At the same time, the first up/down counter 106 performs up counting as "01, 02, 03, . . . " as shown in FIG. 3A. When the count value of the first up/down counter 106 reaches "80," the second up/down counter 109 stops down counting. Only the first up/down counter 106 continuously operates for stabilizing the luminous efficiency of the laser diode 101.

When the first up/down counter 106 underflows, the output of the first up/down counter 106 is added to that of the second up/down counter 109 by the adder 111, to obtain a uniform corrected control voltage shown in FIG. 3C, which is applied to the current amplifier 112.

FIGS. 4A through 4C describe the operation of the first and second up/down counters 106 and 109 and the control voltage applied to the current amplifier 112 for driving the laser diode 101, when the luminous efficiency of the laser diode 101 falls.

When the first up/down counter 106 overflows ("FF"), namely, when the temperature of the laser diode 101 rises and the luminous efficiency falls, the second up/down counter 109 performs up counting as "81, 82, 83, . . . " from the offset value ("80") as shown in FIG. 4B. At the same time, the first up/down counter 106 performs down counting as "FE, FD, FC, . . . " as shown in FIG. 4A. When the count value of the first up/down counter 106 reaches "80", the second up/down counter 106 stops up counting. Only the first up/down counter 106 continuously operates for stabilizing the luminous efficiency of the laser diode 101.

When the first up/down counter 106 overflows, the output of the first up/down counter 106 is added to that of the second up/down counter 109 by the adder 111, to obtain a uniform corrected control voltage shown in FIG. 4C, which is applied to the current amplifier 112.

Therefore, in the present invention, the range of the control voltage is extended and the control error is reduced, due to the addition of the second up/down counter 109, the detector 108, and the second digital-to-analog converter 110.

The present invention can be constructed using various bit resolutions. However, an eight bit structure is preferable, considering manufacturing costs.

According to the present invention, it is possible to generate a control voltage based sufficiently on the luminous efficiency of a laser diode, thus providing a stabilized luminous efficiency and lower control error of the laser diode.

What is claimed is:

1. A temperature compensation apparatus of a laser diode, for controlling an output power of the laser diode according to a variation of a temperature of the laser diode, comprising:
    a first generator to generate an error voltage between a voltage corresponding to the output power of the laser diode and a reference voltage; and
    a second generator, to generate a control voltage in response to the error voltage, and to output, upon the variation in temperature of the laser diode, a corrected control voltage to the laser diode for a predetermined period of time.

2. The apparatus of claim 1, wherein the predetermined period of time ends when a counter up-counting and down-counting based upon the temperature of the laser diode becomes a predetermined offset value.

3. A temperature compensation method of controlling an output power of a laser diode according to a temperature variation thereof, comprising:
    generating an error voltage between a voltage corresponding to the output power of the laser diode and a reference voltage; and
    generating a control voltage by correcting the error voltage based on the output power and upon the variation in temperature of the laser diode extending a range of the control voltage by outputting a corrected control voltage to the laser diode for a predetermined period of time.

4. The method of claim 3, wherein said generation of the control voltage comprises:
    generating a first count value corresponding to the error voltage corrected based on the output power, the first count value representing the variation in temperature of the laser diode, and up and down counting the first count value to change the corrected error voltage according to a detection signal;
    detecting whether the first count value overflows or underflows and generating the detection signal in response to the first count value overflowing or underflowing;
    performing down and up counting of a second count value according to the detection signal, in a reverse order to that of the first count value in said generation of the first count value;
    generating the control voltage based on the corrected error voltage, and adding the first count value to the second count value when the first count value overflows or underflows, which represents the variation in the temperature of the laser diode, to generate the control voltage responsive to the temperature variation as a uniform value.

5. The method of claim 4, wherein said generation of the first count value comprises up counting the first count value to a predetermined offset value according to the detection signal when the first count value underflows, and down counting the first count value to the offset value when the first count value overflows.

6. The method of claim 5, wherein said generation of the control voltage comprises down counting the second count value from a first predetermined value until the first count value becomes the offset value and then maintaining the down counted second count value as a first value, when the first count value underflows, and up counting the second count value from a second predetermined value until the first count value becomes the offset value and then maintaining the up counted second count value as a second value, when the first count value overflows, according to the detection signal.

7. A drive apparatus to drive a laser diode, comprising:
    a light detector to detect an output power of the laser diode;
    a first generator to compare a power voltage corresponding to the output power detected by said light detector with a predetermined voltage, to generate an error voltage; and
    a drive signal generator to generate a drive voltage based upon the error voltage while a luminous efficiency of the laser diode is within a predetermined range, and to generate the drive voltage as a uniform corrected error voltage for a predetermined amount of time in response to the luminous efficiency being outside the predetermined range.

8. The drive apparatus as claimed in claim 7, wherein said drive signal generator comprises:
    a first counter to count a first count value responsive to the error voltage until underflowing or overflowing, and up counts or down counts the first count value in response to underflowing or overflowing, respectively;
    a second counter to generate a second count value as a predetermined uniform value while the first count value is not underflowing or overflowing, and to perform a down counting or an up counting of the second count value simultaneously with the up counting or the down counting of the first count value in response to the first count value underflowing or overflowing, respectively;
    a detector to detect whether the first count value is underflowing or overflowing and to inform the first counter and the second counter of the underflowing or overflowing;
    an adder to add the first count value and the second count value, to generate a summed value as the uniform corrected error voltage; and
    an amplifier to generate a current signal to drive the laser diode based upon the summed value.

9. The drive apparatus as claimed in claim 8, wherein:
    the first counter up counts the first count value from a first initial value to an offset value and down counts the first count value from a second initial value to the offset value in response to the first count value underflowing or overflowing, respectively; and
    the second counter up counts from a third initial value while the first counter down counts the first count value and down counts from a fourth initial value while the first counter up counts the first count value.

10. The drive apparatus as claimed in claim 9, wherein the third and fourth initial values are equal to the offset value.

11. The drive apparatus as claimed in claim 9, wherein the first initial value is "00," the second initial value is "FF," and the third and fourth initial values and the offset value is "80".

12. The drive apparatus as claimed in claim 8, further comprising:
   a first digital-to-analog converter to convert the first count value to a first analog signal; and
   a second digital-to-analog converter to convert the second count value to a second analog signal;
   wherein said adder adds the first and second analog signal to generate the summed value.

13. The drive apparatus as claimed in claim 8, wherein:
   the first counter continuously counts the first count value subsequent to the predetermined amount of time; and
   the second counter maintains the second count value at a fixed value subsequent to the predetermined amount of time.

14. The drive apparatus as claimed in claim 9, wherein:
   the first counter continuously counts the first count value from the offset value subsequent to the predetermined amount of time based upon the error voltage until a subsequent overflowing or underflowing of the first count value; and
   the second counter maintains the second count value at a current fixed value subsequent to the predetermined amount of time until the subsequent overflowing or underflowing of the first count value.

15. A drive apparatus to drive a laser diode, comprising:
   a light detector to detect an output power of the laser diode;
   a first generator to compare a power voltage corresponding to the output power detected by said light detector with a predetermined voltage, to generate an error voltage; and
   a first counter to generate a first count value based upon the error voltage until underflowing or overflowing and then up counting or down counting the first count value in response to the underflowing or overflowing, respectively; and
   a correction control voltage unit to add an additional value to the first count value to generate a summed value as a uniform corrected error voltage for a predetermined amount of time in response to the laser diode having luminous efficiency outside of a predetermined range;
   wherein the additional value is a first uniform value while the first count value is based upon the error voltage and the summed value is a second uniform value while the first count value is up counted or down counted.

16. The drive apparatus as claimed in claim 15, wherein the correction control voltage unit comprises:
   a second counter to generate the first uniform value while the first count value is based upon the error voltage, and up counts and down counts from an initial value in a reverse order from the up counting and the down counting of the first count value in response to the first count value underflowing or overflowing, which indicates that the luminous efficiency of the laser diode is outside the predetermined range.

17. A drive apparatus to drive a laser diode, comprising:
   a light detector to detect an output power of the laser diode; and
   a drive signal generator to generate a first drive signal in response to the output power of the laser diode while the laser diode has a luminous efficiency within a predetermined range, and to generate a second drive signal of a uniform value for a predetermined amount of time in response to the laser diode having the luminous efficiency outside of the predetermined range.

18. The drive apparatus as claimed in claim 17, wherein said drive signal generator comprises a counter to count a first count value in response to the output power of the laser diode and indicating that the luminous efficiency of the laser diode is within or outside the predetermined range based upon whether the first count value is not underflowing, overflowing, or underflowing or overflowing, respectively.

19. A method of driving a laser diode, comprising:
   driving the laser diode with a drive signal;
   detecting an output power of the laser diode;
   determining whether the laser diode has a luminous efficiency within a predetermined range; and
   outputting the drive signal based upon the output power while the luminous efficiency is within the predetermined range and outputting the drive signal as a uniform value for a predetermined time if the luminous efficiency is outside of the predetermined range.

20. The method as claimed in claim 19, wherein said determining comprises:
   up counting or down counting a first count value based upon the output power of the laser diode; and
   determining whether the first count value is overflowing or underflowing; and
   determining that the luminous efficiency is within the predetermined range if the first count value is not overflowing or underflowing and that the luminous efficiency is outside the predetermined range if the first count value is overflowing or underflowing.

21. The method as claimed in claim 20, wherein said outputting comprises:
   generating a uniform second count value while the first count value is not overflowing or underflowing;
   up counting the first count value if the first count value is underflowing and down counting the first count value if the first count value is overflowing;
   up counting or down counting the second count value simultaneously with the down counting or upcounting of the first count value in a reverse order to the down counting or upcounting of the first count value in response to the first count value underflowing or overflowing;
   adding the first and second count values to generate a summed value as the uniform value; and
   generating the drive signal based upon the summed value.

* * * * *